US006778136B2

(12) United States Patent
Gronemeyer

(10) Patent No.: US 6,778,136 B2
(45) Date of Patent: Aug. 17, 2004

(54) FAST ACQUISITION OF GPS SIGNAL

(75) Inventor: Steven A. Gronemeyer, Cedar Rapids, IA (US)

(73) Assignee: SiRF Technology, Inc., San Jose, CA (US)

( * ) Notice: Subject to any disclaimer, the term of this patent is extended or adjusted under 35 U.S.C. 154(b) by 61 days.

(21) Appl. No.: 10/017,115

(22) Filed: Dec. 13, 2001

(65) Prior Publication Data

US 2003/0112179 A1 Jun. 19, 2003

(51) Int. Cl.[7] .................................................. G01S 5/14
(52) U.S. Cl. ............................ 342/357.15; 342/357.12
(58) Field of Search ........................ 342/357.15, 357.02, 342/357.12, 357.06, 358

(56) References Cited

U.S. PATENT DOCUMENTS

| | | | | |
|---|---|---|---|---|
| 3,604,911 | A | 9/1971 | Schmitt ...................... | 235/181 |
| 3,975,628 | A | 8/1976 | Graves et al. .............. | 250/199 |
| 4,426,712 | A | 1/1984 | Gorski-Popiel ............. | 375/96 |
| 4,445,118 | A | 4/1984 | Taylor et al. ............... | 343/357 |
| 4,463,357 | A | 7/1984 | MacDoran .................. | 343/460 |
| 4,578,678 | A | 3/1986 | Hurd .......................... | 343/357 |
| 4,667,203 | A | 5/1987 | Counselman, III .......... | 342/357 |
| 4,701,934 | A | 10/1987 | Jasper ......................... | 375/1 |
| 4,754,465 | A | 6/1988 | Trimble ...................... | 375/1 |
| 4,785,463 | A | 11/1988 | Janc et al. ................... | 375/1 |
| 4,809,005 | A | 2/1989 | Counselman, III .......... | 342/352 |
| 4,821,294 | A | 4/1989 | Thomas, Jr. ................ | 375/96 |
| 4,890,233 | A | 12/1989 | Ando et al. ................. | 364/457 |
| 4,894,662 | A | 1/1990 | Counselman ............... | 342/357 |
| 4,894,842 | A | 1/1990 | Broekhoven et al. ......... | 375/1 |
| 4,992,720 | A | 2/1991 | Hata ........................... | 320/23 |
| 4,998,111 | A | 3/1991 | Ma et al. .................... | 342/352 |
| 5,014,066 | A | 5/1991 | Counselman, III .......... | 342/352 |

(List continued on next page.)

FOREIGN PATENT DOCUMENTS

| | | |
|---|---|---|
| EP | 0639901 A2 | 2/1995 |
| EP | 0639901 A3 | 2/1995 |
| JP | 08/065205 A | 3/1996 |
| WO | WO 92/13392 | 8/1992 |
| WO | WO 00/10028 A1 * | 2/2000 ............. G01S/5/00 |
| WO | WO 00/19644 | 4/2000 |

OTHER PUBLICATIONS

D. J. R. Van Nee and A. J. R. M. Coenen, "New Fast GPS Code–Acquistion Technique Using FFT," Jan. 17, 1991, *Electronics Letters*, vol. 27, No. 2.

Primary Examiner—Thomas H. Tarcza
Assistant Examiner—Fred H Mull
(74) Attorney, Agent, or Firm—The Eclipse Group

(57) ABSTRACT

Upon reception of four GPS signals from GPS satellites and determining four pseudo ranges, along with ephemeris data previously stored in the GPS receiver, the location of the GPS receiver and real time clock time error is determined. The GPS receiver is in possession of four pseudo ranges and determines four unknown coordinate values (x, y, x, and time) identifying the location of the GPS receiver and real time clock error. The process of solving for four pseudo range formulas simultaneously with each pseudo range formula having an unknown "x", "y" "z", and time coordinates of the GPS receiver, results in identification of the coordinates and time of the GPS receiver. In a similar process, the GPS receiver receiving four GPS signals from four GPS satellites is able to determine four pseudo ranges. Using the four pseudo ranges, four pseudo range equations unknown values for "x", "y", "z" and time can be solved for simultaneously. The resulting values are then used to verify that the calculated positions of the GPS satellites are within 0.5 ms of the previous solution. If the GPS satellites are within 0.5 ms range of the prior solution then the real time clock error is estimated. Thus, using ephemeris data, the location of the GPS receiver is determined in a fraction of the time it takes to acquire the GPS satellites using conventional approaches.

17 Claims, 5 Drawing Sheets

U.S. PATENT DOCUMENTS

| | | | | |
|---|---|---|---|---|
| 5,018,088 A | 5/1991 | Higbie | | 364/574 |
| 5,036,329 A | 7/1991 | Ando | | 342/357 |
| 5,043,736 A | 8/1991 | Darnell et al. | | 342/357 |
| 5,108,334 A | 4/1992 | Eschenbach et al. | | 455/314 |
| 5,148,042 A | 9/1992 | Nakazoe | | 307/65 |
| 5,153,591 A | 10/1992 | Clark | | 341/51 |
| 5,179,724 A | 1/1993 | Lindoff | | 455/76 |
| 5,202,829 A | 4/1993 | Geier | | 364/499 |
| 5,225,842 A | 7/1993 | Brown et al. | | 342/357 |
| 5,253,268 A | 10/1993 | Omura et al. | | 375/1 |
| 5,276,765 A | 1/1994 | Fremman et al. | | 395/2 |
| 5,293,170 A | 3/1994 | Lorenz et al. | | 376/309 |
| 5,293,398 A | 3/1994 | Hamao et al. | | 375/1 |
| 5,297,097 A | 3/1994 | Etoh et al. | | 365/226 |
| 5,311,195 A | 5/1994 | Mathis et al. | | 342/357 |
| 5,323,164 A | 6/1994 | Endo | | 342/357 |
| 5,343,209 A | 8/1994 | Sennott et al. | | 342/357 |
| 5,345,244 A | 9/1994 | Gildea et al. | | 342/357 |
| 5,347,536 A | 9/1994 | Meehan | | 375/1 |
| 5,352,970 A | 10/1994 | Armstrong, II | | 320/39 |
| 5,363,030 A | 11/1994 | Ford et al. | | 320/13 |
| 5,378,155 A | 1/1995 | Eldridge | | 434/11 |
| 5,379,224 A | 1/1995 | Brown et al. | | 364/449 |
| 5,396,515 A | 3/1995 | Dixon et al. | | 375/208 |
| 5,402,346 A | 3/1995 | Lion et al. | | 364/436 |
| 5,402,347 A | 3/1995 | McBurney et al. | | 364/443 |
| 5,410,747 A | 4/1995 | Ohmagari et al. | | 455/118 |
| 5,416,712 A | 5/1995 | Geier et al. | | 364/450 |
| 5,418,818 A | 5/1995 | Marchetto et al. | | 375/264 |
| 5,420,593 A | 5/1995 | Niles | | 342/357 |
| 5,440,313 A | 8/1995 | Osterdock et al. | | 342/352 |
| 5,450,344 A | 9/1995 | Woo et al. | | 364/449 |
| 5,498,239 A | 3/1996 | Galel et al. | | 604/95 |
| 5,504,684 A | 4/1996 | Lau et al. | | 364/443 |
| 5,546,445 A | 8/1996 | Dennison et al. | | 379/60 |
| 5,548,613 A | 8/1996 | Kahu et al. | | 375/208 |
| 5,550,811 A | 8/1996 | Kahu et al. | | 370/18 |
| 5,568,473 A | 10/1996 | Hemmati | | 370/18 |
| 5,577,023 A | 11/1996 | Marum et al. | | 370/16 |
| 5,577,025 A | 11/1996 | Skinner et al. | | 370/22 |
| 5,592,173 A | 1/1997 | Lau et al. | | 342/357 |
| 5,594,453 A | * 1/1997 | Rodal et al. | | 342/357.15 |
| 5,608,722 A | 3/1997 | Miller | | 370/320 |
| 5,623,485 A | 4/1997 | Bi | | 370/209 |
| 5,625,668 A | 4/1997 | Loomis et al. | | 379/58 |
| 5,629,708 A | * 5/1997 | Rodal et al. | | 342/357.15 |
| 5,640,429 A | 6/1997 | Michaels et al. | | 375/340 |
| 5,640,431 A | 6/1997 | Bruckert et al. | | 375/344 |
| 5,642,377 A | 6/1997 | Chung et al. | | 375/200 |
| 5,644,591 A | 7/1997 | Sutton | | 375/200 |
| 5,649,000 A | 7/1997 | Lee et al. | | 455/436 |
| 5,650,792 A | 7/1997 | Moore et al. | | 343/725 |
| 5,654,718 A | 8/1997 | Beason et al. | | 342/357 |
| 5,663,734 A | 9/1997 | Krasner | | 342/357 |
| 5,663,735 A | 9/1997 | Eshenbach | | 342/357 |
| 5,689,814 A | 11/1997 | Hagisawa et al. | | 455/69 |
| 5,722,061 A | 2/1998 | Hutchison, IV et al. | | 455/245.1 |
| 5,734,674 A | 3/1998 | Fenton et al. | | 375/207 |
| 5,734,966 A | 3/1998 | Farrer et al. | | 455/63 |
| 5,737,329 A | 4/1998 | Horiguchi | | 370/342 |
| 5,739,596 A | 4/1998 | Takizawa et al. | | 307/66 |
| 5,749,067 A | 5/1998 | Barrett | | 704/233 |
| 5,781,156 A | 7/1998 | Krasner | | 342/357 |
| 5,784,695 A | 7/1998 | Upton et al. | | 455/442 |
| 5,786,789 A | 7/1998 | Janky | | 342/357 |
| 5,812,087 A | 9/1998 | Krasner | | 342/357 |
| 5,825,327 A | 10/1998 | Krasner | | 342/357 |
| 5,828,694 A | 10/1998 | Schipper | | 375/208 |
| 5,831,574 A | 11/1998 | Krasner | | 342/357 |
| 5,832,021 A | 11/1998 | Kondo | | 375/200 |
| 5,841,396 A | 11/1998 | Krasner | | 342/357 |
| 5,845,203 A | 12/1998 | LaDue | | 455/414 |
| 5,854,605 A | 12/1998 | Gildea | | 342/357 |
| 5,862,465 A | 1/1999 | Ou | | 455/234.1 |
| 5,867,535 A | 2/1999 | Phillips et al. | | 375/295 |
| 5,867,795 A | 2/1999 | Novis et al. | | 455/566 |
| 5,872,540 A | 2/1999 | Casabona et al. | | 342/362 |
| 5,874,914 A | 2/1999 | Krasner | | 342/357 |
| 5,877,724 A | 3/1999 | Davis | | 342/357 |
| 5,877,725 A | 3/1999 | Kalafus | | 342/357 |
| 5,881,371 A | 3/1999 | Reynolds | | 455/83 |
| 5,883,594 A | 3/1999 | Lau | | 342/357 |
| 5,884,214 A | 3/1999 | Krasner | | 701/207 |
| 5,889,474 A | 3/1999 | LaDue | | 340/825.49 |
| 5,903,654 A | 5/1999 | Milton et al. | | 380/49 |
| 5,907,809 A | 5/1999 | Molnar et al. | | 455/456 |
| 5,909,640 A | 6/1999 | Farrer et al. | | 455/63 |
| 5,917,444 A | 6/1999 | Loomis et al. | | 342/357 |
| 5,917,829 A | 6/1999 | Hertz et al. | | 370/479 |
| 5,920,283 A | 7/1999 | Shaheen et al. | | 342/357 |
| 5,923,703 A | 7/1999 | Pon et al. | | 375/209 |
| 5,924,024 A | 7/1999 | Ikeda et al. | | 455/313 |
| 5,926,131 A | 7/1999 | Sakumoto et al. | | 342/357 |
| 5,936,572 A | 8/1999 | Loomis et al. | | 342/357 |
| 5,943,363 A | 8/1999 | Hanson et al. | | 375/206 |
| 5,945,944 A | 8/1999 | Krasner | | 342/357.06 |
| 5,956,328 A | 9/1999 | Sato | | 370/335 |
| 5,963,582 A | 10/1999 | Stansell, Jr. | | 375/200 |
| 5,970,084 A | 10/1999 | Honda | | 375/200 |
| 5,977,909 A | 11/1999 | Harrison et al. | | 342/357.09 |
| 5,982,324 A | 11/1999 | Watters et al. | | 342/357.06 |
| 5,987,016 A | 11/1999 | He | | 370/335 |
| 5,991,309 A | 11/1999 | Jensen et al. | | 370/492 |
| 5,991,613 A | 11/1999 | Euscher et al. | | 455/277.1 |
| 5,995,537 A | 11/1999 | Kondo | | 375/208 |
| 5,999,124 A | 12/1999 | Sheynblat | | 342/357.09 |
| 6,002,362 A | 12/1999 | Gudat | | 342/357.03 |
| 6,002,363 A | 12/1999 | Krasner | | 342/357.1 |
| 6,002,709 A | 12/1999 | Hendrickson | | 375/206 |
| 6,009,551 A | 12/1999 | Sheynblat | | 714/776 |
| 6,016,119 A | 1/2000 | Krasner | | 342/357.06 |
| 6,018,704 A | * 1/2000 | Kohli et al. | | 701/213 |
| 6,023,462 A | 2/2000 | Nieczyporowicz et al. | | 370/335 |
| 6,041,222 A | 3/2000 | Horton et al. | | 455/255 |
| 6,047,016 A | 4/2000 | Ramberg et al. | | 375/200 |
| 6,047,017 A | 4/2000 | Cahn et al. | | 375/200 |
| 6,049,715 A | 4/2000 | Willhoff et al. | | 455/436 |
| 6,052,081 A | 4/2000 | Krasner | | 342/357.02 |
| 6,061,018 A | 5/2000 | Sheynblat | | 342/357.06 |
| 6,064,336 A | 5/2000 | Krasner | | 342/357.05 |
| 6,064,688 A | 5/2000 | Yanagi | | 375/149 |
| 6,075,809 A | 6/2000 | Naruse | | 375/147 |
| 6,104,338 A | 8/2000 | Krasner | | 342/357.06 |
| 6,104,340 A | 8/2000 | Krasner | | 342/357.1 |
| 6,107,960 A | 8/2000 | Krasner | | 342/357.09 |
| 6,111,540 A | 8/2000 | Krasner | | 342/357.1 |
| 6,131,067 A | 10/2000 | Girerd et al. | | 701/213 |
| 6,133,871 A | 10/2000 | Krasner | | 342/357.06 |
| 6,133,873 A | 10/2000 | Krasner | | 342/357.12 |
| 6,133,874 A | 10/2000 | Krasner | | 342/357.15 |
| 6,150,980 A | 11/2000 | Krasner | | 342/357.1 |
| 6,204,808 B1 | * 3/2001 | Bloebaum et al. | | 342/357.07 |
| 6,329,946 B1 | * 12/2001 | Hirata et al. | | 342/357.12 |
| 2003/0083814 A1 | * 5/2003 | Gronemeyer | | 342/357.12 |

\* cited by examiner

FAST ACQUISITION OF GPS SIGNAL

BACKGROUND OF THE INVENTION

1. Technical Field

This invention relates generally to protocols and, in particular, to acquisition of global positioning signal.

2. Related Art

The global positioning satellite (GPS) system is a satellite based navigation system having a network of 24 satellites, plus on orbit spares, orbiting 11,000 nautical miles above the Earth. Each satellite in the system orbits the Earth every twelve hours.

A prime function of GPS satellites is to serve as a clock that keeps GPS time. Each satellite derives a signal from an on board 10.23 MHz Cesium atomic clock. GPS time is kept in terms of seconds and weeks since Jan. 6, 1980. There are 604,800 seconds per week. Consequently, GPS time is stated in terms of a time of week (TOW) and a week number. TOW ranges from 0 to 604800. The week number started with week zero and is currently in excess of 1000 weeks. The TOW can have a fractional part, such as in the real time clock, where the resolution is $\frac{1}{32,768}^{th}$ of a second. GPS time is fundamental to the GPS system. At each GPS satellite, the time of transmission of each chip is controlled down to a few nanoseconds. Consequently, knowledge of precise GPS time allows one to know exactly what chip of a satellite's waveform is being transmitted at any given time.

Each satellite transmits a GPS spread spectrum signal having an individual pseudo noise (PN) code. By transmitting several GPS signals over the same spectrum with each GPS signal having distinctly different PN coding sequences, the satellites may share the same bandwidth without interfering with each other. The PN codes used in the GPS system are 1023 bits long and are sent at a rate of 1.023 megabits per second, yielding a time mark, called a "chip" approximately once every micro-second. The sequence repeats once every millisecond and is called the course acquisition code (C/A code). Every 20th cycle the C/A code can change phase and is used to encode a 1500 bit long frame of data that contains a precise orbital description for the transmitting satellite, called ephemeris data, and approximate orbital descriptions for all satellites in orbit, called almanac data. The ephemeris data repeat each frame, while the almanac data are distributed over 25 frames before repeating. Various other data are also included in the overall frame structure.

There are 32 PN codes designated by the GPS authority for use in orbiting satellites. Additional codes are designated for other purposes. Twenty-four PN codes are assigned to current satellites in orbit. The remaining PN codes are spare codes that may be used in new satellites to replace old or failing satellites. A GPS receiver may, using the different PN code sequences, search the signal spectrum looking for a match. If the GPS receiver finds a match, then it is able to identify the satellite that generated the GPS signal.

GPS receivers may use a variant of radio direction finding (RDF) methodology, called triangulation, in order to determine the position on the Earth of the GPS receiver. The position determination is different from the RDF technology in that the radio beacons are no longer stationary; they are satellites moving through space at a speed of about 1.8 miles per second as they orbit the Earth. By being spaced based, the GPS system can be used to establish the position of virtually any point on Earth using a triangulation method.

The triangulation method depends on the GPS receiver units obtaining a time signal from multiple GPS satellites enabling the distance to each satellite to be calculated. If, for example, the GPS satellite is 11,000 nautical miles from the GPS receiver, then the GPS receiver must be somewhere on a location sphere having a radius of 11,000 nautical miles from the GPS satellite. When the GPS receiver ascertains the position of a second GPS satellite, then the GSP receiver calculates its location based on a location sphere around the second GPS satellite. The possible location of the GPS receiver on the two spheres lies at there intersects and forms a circle. To further resolve the location of the GPS receiver, the distance from a third GPS satellite to the GPS receiver is determined to be a location sphere around the third GPS satellite. The location sphere of the third satellite intersects the location circle produced by the intersection of the location sphere of the first two GPS satellites at just two points. By determining the location sphere of one more GPS satellite, whose location sphere will intersect one of the two possible location points, the precise position of the GPS receiver is determined. As a consequence of the GPS system, the exact time may also be determined, because there is only one time offset that can account for the positions of all the satellites. The triangulation method may yield positional accuracy on the order of 30 meters, however the accuracy of GPS position determination may be degraded due to signal strength and multipath reflections of the satellite signals.

GPS receivers may have visibility of as many as 12 GPS satellite signals at one time at the surface of the earth. The number of orbiting satellites that are visible depends on the location of the receiver and the locations of the satellites at a given point in time. The number visible in an unobstructed location may vary from approximately 5 to 12 satellites. In certain environments such as a canyon, some GPS satellites may be blocked out, and the GPS position determining system may depend for position information on satellites that have weaker signal strengths, such as GPS satellites near the horizon. In other cases overhead foliage may reduce the signal strength of the GPS satellites that are received by the GPS receiver unit. In either case the signal strength is reduced.

There are multiple ways of using radio spectrum to communicate. For example in frequency division multiple access (FDMA) systems, the frequency band is divided into a series of frequency slots and different transmitters are allotted different frequency slots. In time division multiple access (TDMA) systems, the time that each transmitter may broadcast is limited to a time slot, such that transmitters transmit their messages one after another during an allotted period. Furthermore, the frequency upon which each transmitter transmits in a TDMA system may be a constant frequency or may be continuously changing (commonly referred to as frequency hopping).

A third way of allotting the radio spectrum to multiple users is through the use of code division multiple access (CDMA) also known as spread spectrum communication. In a CDMA system, all users transmit on the same frequency band all of the time. Each user has a dedicated code that is used to separate his transmission from transmissions from other users. This dedicated code is commonly referred to as a spreading code, because it spreads the information across the band. The code is also commonly referred to as a Pseudo Noise or PN code. In a CDMA transmission, each bit of transmitted data is replaced by a particular spreading code associated with a user. If the data to be transmitted is a binary "1", then the particular spreading code is transmitted. If the data to be transmitted is a binary "0", then the spreading code is replaced by the inverse of the spreading code.

To decode the transmission at the receiver it is necessary to "despread" the code. The dispreading process takes the incoming signal and multiplies it by the spreading code and sums the results. This process is commonly known as correlation, and it is commonly said that the signal is correlated with the PN code. The result of the dispreading process is that the original data may be separated from all other transmissions, and the original signal is recovered. A property of PN codes used in CDMA systems is that the presence of one spread spectrum code does not change the result of the decoding of another code. The property that one code does not interfere with the presence of another code is often referred to as orthogonality, and codes that possess this property are said to be orthogonal codes.

To decode the transmission at the receiver it is necessary to "despread" the code. The dispreading process takes the incoming signal and multiplies it by the spreading code and sums the results. This process is commonly known as correlation, and it is commonly said that the signal is correlated with the PN code. The result of the dispreading process is that the original data may be separated from all other transmissions, and the original signal is recovered. A property of PN codes used in CDMA systems is that the presence of one spread spectrum code does not change the result of the decoding of another code. The property that one code does not interfere with the presence of another code is often referred to as orthogonality, and codes that possess this property are said to be orthogonal codes.

It is because CDMA spreads the data across the broadcast spectrum that CDMA is often referred to as spread spectrum. The global positioning system (GPS) uses spread spectrum technology to convey data to ground units. The use of spread spectrum is especially advantageous in the GPS systems. Spread spectrum technology enables GPS receivers to operate on a single frequency, thus saving on additional electronics that would be needed to switch and tune to other bands if multiple frequencies were used. A spread spectrum system also minimizes power consumption requirements compared to other types of radio systems. GPS transmitters for example require 50 watts or less and tolerate substantial interference.

A GPS receiver determines its position by measuring the range to four or more satellites. Since the positions of the satellites are known by evaluating their orbital equations, the location of the receiver can then be computed. The orbital equations are based on parameters broadcast by the satellites. For precise position, the more precise ephemeris parameters are required. In order to determine the range to a satellite, knowledge of GPS system time must be known, because the orbital equations are a function of time. The satellites orbit the earth about twice per day. The normal procedure is to use synchronization and time data provided by the GPS signal from each satellite. Using this procedure requires at least 6 seconds because the synchronization is repeated one time in each 6-second sub-frame of the GPS signal structure.

The use of data collection from the satellite to resolve GPS time requires at least 6 seconds to decode the required data to provide a common time error for all of the satellite signals being received. When the initial time and position data are accurate to better than ±0.5 PN code period (±0.5 ins), the common value of time error for all satellites can be computed without the need to obtain this data from the satellites' signal structure. Advances in digital integrated circuit technology allows acquisition of the PN codes of several satellites in less than a second rather than the tens of seconds requires a few years ago. Hence the minimum six second penalty to establish a common time error by the conventional approach is now the dominant time delay in realizing the initial position solution. In many applications, it is critical to provide position updates with minimized expenditure of energy from a battery. This can be done most efficiently if most circuitry of the receiver can be turned off between position updates. With the circuitry off, synchronization with the received waveforms of the various satellites is lost and has to be reestablished for the next position update. What is needed in the art is an approach to maintaining time between updates with low power consumption penalties and an approach to resolving code-period range ambiguity to a GPS satellite system in tens of milliseconds, rather than several seconds.

SUMMARY

Broadly conceptualized, the invention is an approach to rapidly, relative to known methods, identify the location of a GPS receiver. The GPS receiver receives a number of GPS signal from at least four GPS satellites and determines pseudo ranges (range measurements with a bias error that is common to all of the measurements) to each of the four satellites by resolving the code-period ambiguity of the range and determining the current received code phase being received from each satellite. Using the pseudo range and the location of each of the transmitting GPS satellites, the GPS receiver determines the coordinates of its location by solving the pseudo navigation equations simultaneously for the receiver location and local time base clock error. Thus, the GPS receiver is able to resolve the location of the GPS receiver in less time than traditional approaches while avoiding the always on power consumption penalties.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

Figure 1:
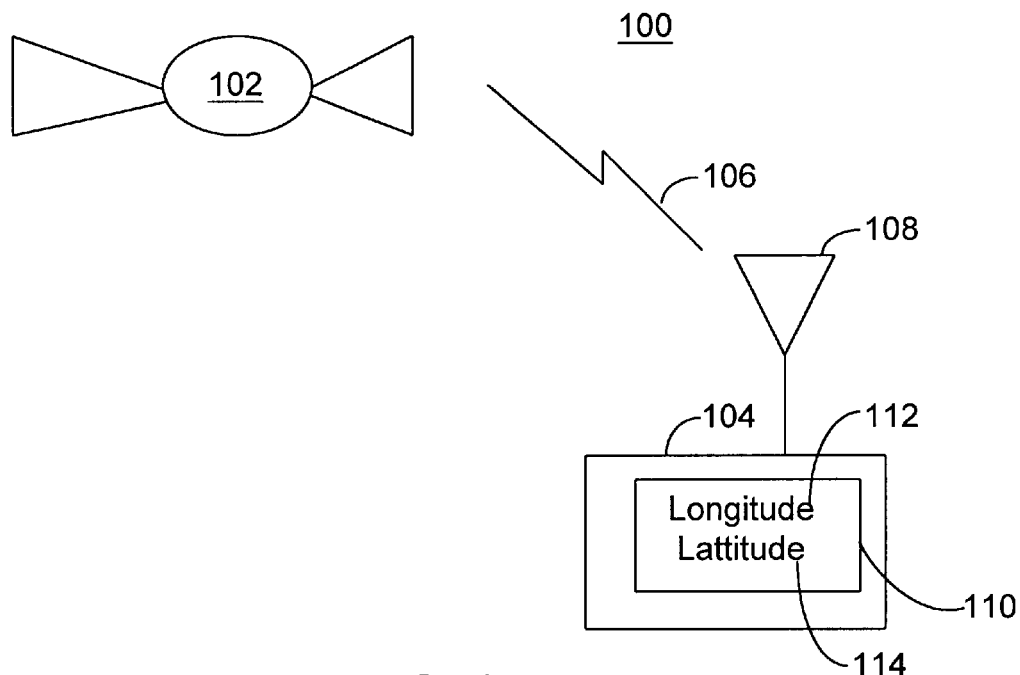
FIG. 1 is an illustration of single GPS satellite 102 and a single receiver 104 in GPS system 100 in accordance with the invention.

In FIG. 1, a global positing satellite (GPS) system 100 with a single satellite 102 and a single GPS receiver 104 is illustrated. The satellite 102 communicates with a GPS receiver 104 over a radio frequency (RF) GPS signal 106 that is received by GPS receiver 104 at antenna 108. Upon communication with four satellites (only one is shown in the illustration), the GPS receiver 104 calculates a position and time; for example, it may display latitude 112, longitude 114, altitude, and time.

Figure 2:
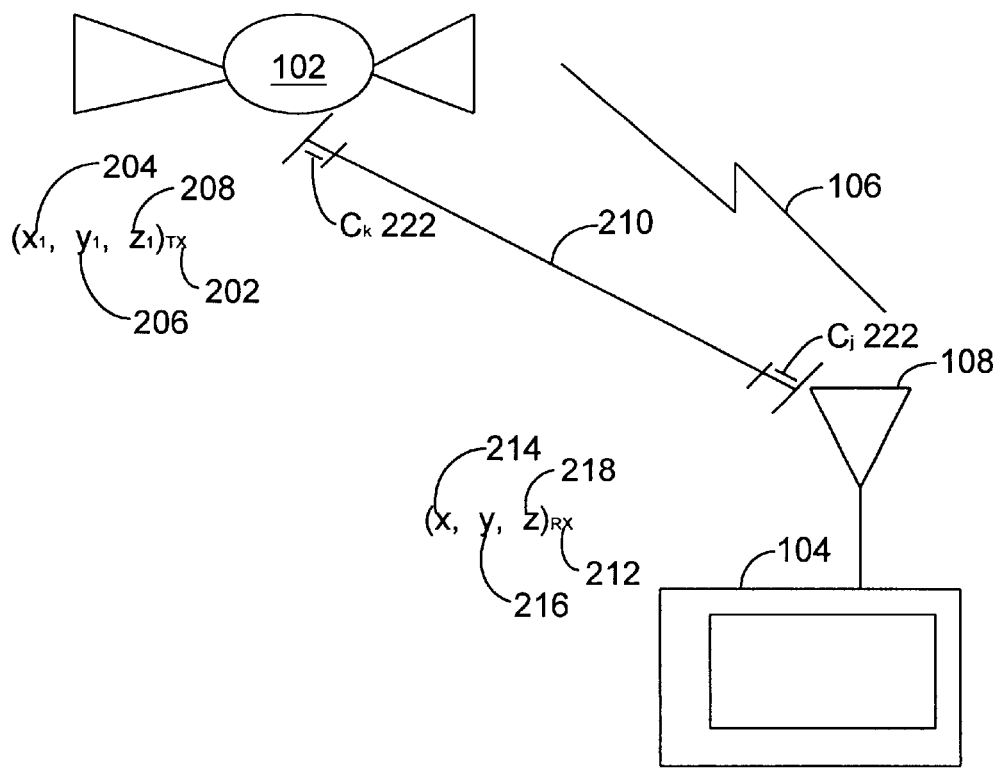
FIG. 2 is an illustration of the GPS satellite 102 and the GPS receiver 104 of FIG. 1 having the antenna 108 are at a range 210 of approximately 11,000 nautical miles

In FIG. 2, the satellite 102 and the GPS receiver 104 of FIG. 1 at a range 210 of approximately 11,000 nautical miles is shown. The range 210 is not a constant distance because the satellite 102 circles the Earth in its orbit approximately twice per day as the earth turns on its axis once per day. The satellite 102 transmits a spread spectrum GPS signal 106 to the GPS receiver 104. The GPS signal 106 contains a data sequence imposed on the spread spectrum signal. The data sequence comprises 30-second frames of data. Part of the data contained in each frame is a precise description of the orbit of the transmitting satellite as a function of time. This data can be used in orbital equations and evaluated for a particular time of interest to determine the precise (less than one meter of error) location of the satellite at that instant. The precise coordinates 202 are "x" 204, "y" 206 and "z" 208 at time t, where (x, y, z) are in the so-called Earth-Centered-Earth-Fixed (ECEF) coordinate system used by the GPS system and time t is expressed in the GPS system time. Each 30-second frame is subdivided into five sub-frames of six seconds each. Each sub-frame contains ten encoded data words of 30 bits each for a total of 300 bits per sub-frame. Each data bit contains 20 repetitions of the PN code used by that satellite. Each period of the PN code contains 1023 PN chips and has a time-duration of one millisecond.

A PN code period that is 1 millisecond long represents approximately three hundred kilometers in terms of distance (speed-of-light times propagation time=2.99792458e8 m/s*1e-3 s=299.792458 km). Similarly, one of the 1023 PN chips in a code period represents approximately 300 meters in terms of distance (speed-of-light times propagation time= 2.99792458e8 m/s*1e-3 s/1023=293.0522561 m).

A chip $C_k$ 222 is transmitted at GPS time T from the satellite 102. The receiver 104 has an estimate of GPS time T+dT, where dT is the error in the receiver's knowledge of GPS time. The receiver 104 calculates the satellite coordinates 202 using its estimate T+dT of GPS time as "x1" 204, "y1" 206, and "z1" 208 values. In making this calculation, the receiver uses ephemeris data for the satellite that was previously collected or obtained from some other source. Because the error in the receiver's GPS time estimate is assumed small (magnitude of the error less than 0.5 ms), the error in the satellite position calculated will also be small (order of meters). Thus, at transmit time "T" the transmitted coordinates 202 of satellite 102 are known with good approximation when chip $C_k$ 222 is transmitted. The receiver also retains its current estimate of its location as "x" 214, "y" 216, and "z" 218 from the previous operation. At the same time T, the receiver is receiving chip $\hat{C}_j$. The pseudorange PR can be estimated as follows:

$$R = (x-x_1)^2 + (y-y_1)^2 + (z-z_1)^2$$

$$\hat{C}_j = \left[\frac{R}{c} 1.023e6 + C_k\right]_{Modulo\ 1023}$$

$PR = R - (C_j - \hat{C}_j)L_{chip}$ for $|(C_j - \hat{C}_j)_{Modulo\ 1023}| < 512$ $PR = R + [1023 - (C_j - \hat{C}_j)]L_{chip}$ for $|(C_j - \hat{C}_j)_{Modulo\ 1023}| \geq 512$ where:

(x, y, z) are coordinates for the receiver;

$(x_1, y_1, z_1)$ are coordinates for the satellite;

R is the estimated a priori range from the satellite to the receiver;

c is the speed of light (299792458 m/s)

$C_k$ is chip transmitted by the satellite at time T;

$C_j$ is the chip received at the receiver at time T+dT $\hat{C}_j$ is expected chip at the receiver at time T; and $L_{chip}$ is the distance the signal propagates in one chip time (c/1.023e6=293.0522561 m).

Figure 3:
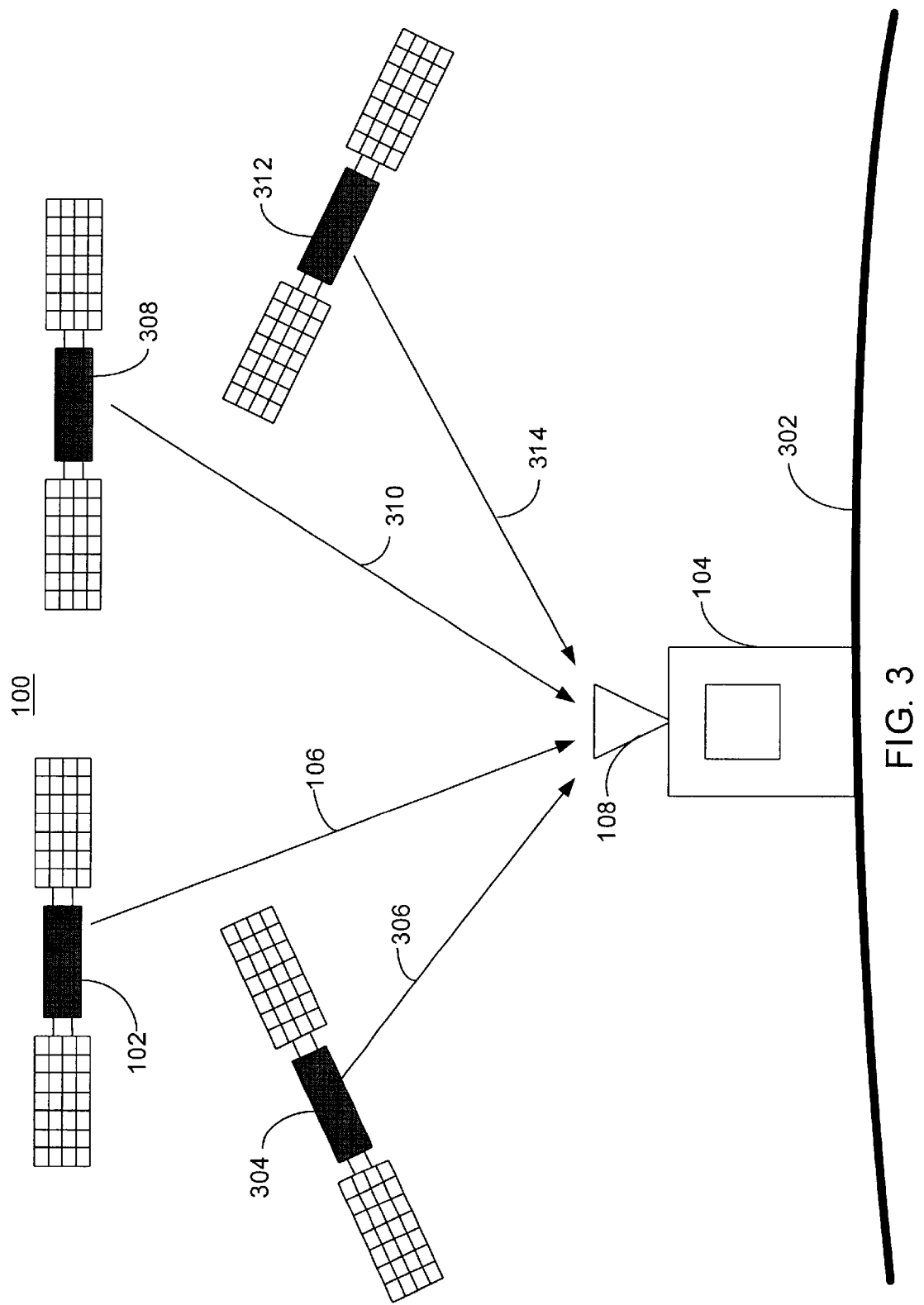
FIG. 3 is a diagram of the GPS system 100 having four satellites 102, 304, 308, and 312 in communication with the GPS receiver 104 of FIG. 1 located in close proximity to the surface of the Earth 302.

In FIG. 3, a diagram of GPS system 100 of FIG. 1 having a GPS receiver 104 located on the Earth 302 in communication with four satellites 102, 304, 308, and 314 is shown. The GPS receiver 104 via antenna 108 receives the GPS signal 306, 106, 310, and 314 from the four satellites 102, 304, 308, and 312. The four GPS signals 306, 106, 310, and 314 are spread spectrum signals that are transmitted at the same frequency. It is desirable for the GPS receiver 104 to be receiving GPS signals from as many satellites as possible, but to resolve the location, such as the x, y and z coordinates, at the GPS receiver 104, at least four GPS satellites in the GPS system 100 must be in communication with the receiver 104. If the altitude of the receiver is known, three satellites can suffice to determine a solution.

If the receiver has a local clock having an error of less than 0.5 ms relative to GPS time, the 6-seconds required for synchronization can be avoided and the position solution can be determined as soon as three or more satellites are in track. Note that the error in the receiver's initial estimate of its position is equivalent to an error in its initial estimate of GPS system time. Hence a more precise statement of the requirements is that the combined error in the receiver's initial time estimate and the equivalent time error due to its initial position error must be less than 0.5 ms.

The requirement of a maximum error of 0.5 ms arises as follows. The propagation time from a satellite to a receiver on the surface of the earth is approximately 70 ms. The propagation time is less if the satellite is directly overhead and is more when the satellite is near the horizon, with the maximum variation being approximately the radius of the earth. The time of one period of the PN code of a given satellite is 1 ms. Hence, there are on average 70 periods of the PN code propagating from the satellite to the receiver at any point in time. Once the receiver has locked onto the PN code, it knows to a fraction of a microsecond which point in the PN code period is being received at a given instant. The receiver knows a priori which point in the overall GPS signal structure is being transmitted at any instant of time. However, without knowledge of GPS system time, the receiver cannot know where in the overall signal structure the PN code period it is currently receiving is located. On the other hand, if the receiver does know GPS system time to better than 0.5 ms (better than one half of a code period), then it can determine where this code period fits in the overall GPS signal structure. Using the initial time estimate in the orbital equations provides estimates of satellite positions. These position estimates along with the initial position of the receiver, allows the propagation time from the satellite to the receiver to be known to better than 0.5 ms. This propagation time along with the initial time value provides an estimate of which PN chip of the code period should currently be expected to arrive at the receiver. Since the receiver is synchronized to the PN waveform, it knows which chip is actually being received at the present time. The difference in these two values represents the combined error in the receiver's initial estimate of time and position. If the receiver could determine the error in its time estimate, it could then solve for the position error. With measurements from four or more satellites, the receiver can simultaneously solve for three dimensional position and time. The time error is the same in the propagation time measurement for each of the four or more satellites because all but the position in the final code period propagating from the satellite to the receiver is known from the initial time and position data. If this were not true, the time error to each satellite would have an additional component of some number of full code periods (1 ms increments) more or less than the correct value. Resolving the values of these added parameters is far more difficult.

Figure 4:
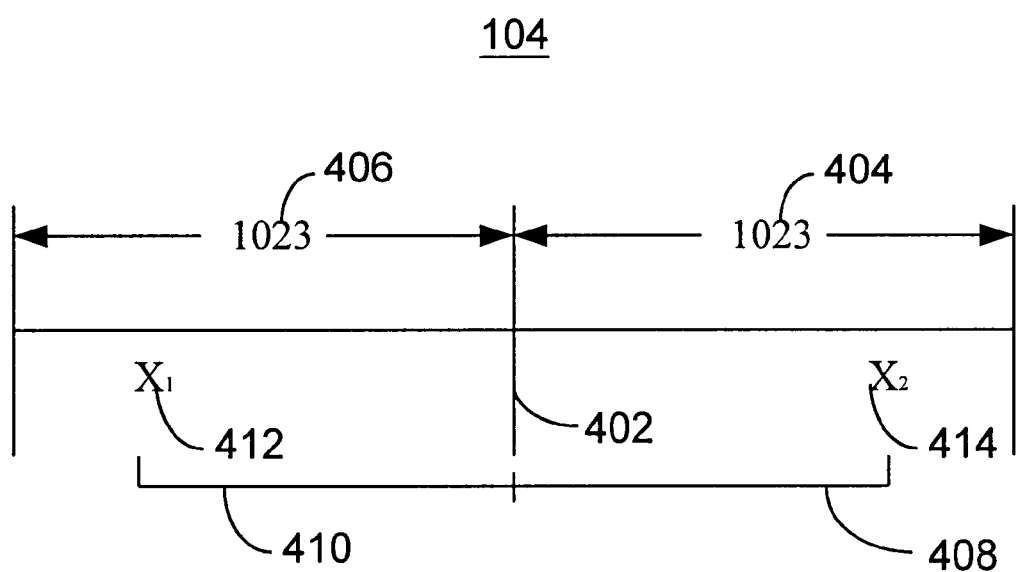
FIG. 4 is a diagram of determining the pseudo range if the partial received code period in the received GPS RF signal 104 is greater than a half period.

In FIG. 4, a diagram for determining the adjustment to a priori range R to determine pseudo range estimate PR is shown. The diagram illustrates the case in which the received chip (code phase) is more than one half of the PN code period from the expected receive chip (code phase). The expected chip $\hat{C}_j$ is illustrated as occurring at point 402. Since the PN code has period 1023 chips, the same chip will recur at positions 1023 chips before 404 and after position 406. The chip actually received at time T+dT is expected to be received at a code phase no more than 511 chips before 404 and no less than 512 chips after 410 $\hat{C}_j$ 402. This is because the assumed time error (due to both time error and time-equivalent position error) is less than one half code period, or 0.5 ms. The range R is then adjusted by subtracting the difference between the expected and actual received chips, with the difference computed modulo 1023. The figure illustrate that care must be taken in the way in which chip phase is calculated. Typically, the chips in one period of the code are labeled from 0 to 1022. When the modulo 1023 difference in code phase between $\hat{C}_j$ and $\hat{C}_j$ exceeds 512 (and the 0.5 ms hypothesis is valid) it must be recognized that the actual modulo 1023 difference is less than 512 and that the value is obtained by subtracting 1023. This is shown in the figure for code phase values $X_1$ 412 and $X_2$ 414. In the case of $X_1$ 412 the code phase must be adjusted by subtracting 1023 chips. In the case of $X_2$ 414 the code phase must be adjusted by adding 1023 chips.

Upon reception of the GPS signal from at least three GPS satellites 102, 304 and 308, of FIG. 3, the GPS receiver is able to determine three pseudo ranges, each associated with a GPS satellite 102, 304 and 308 respectively. Once the GPS receiver 104 has the three pseudo ranges and the GPS receiver 104 is able to identify three unknown coordinate values (x, y and z) that identify the location of GPS receiver 104. The process of solving the three pseudo range formulas simultaneously with each pseudo range formula having the x, y and z coordinates of the GPS receiver, results in identification x 214, y 216 and z 218 (the location of the GPS receiver 104). Upon reception of the GPS signal from at least four GPS signals from four different GPS satellites 102, 304, 308, and 312, the GPS receiver is able to determine four pseudo ranges, each associated with a GPS satellite 102, 304, 308 and 312, respectively. Using the four pseudo ranges, four pseudo range equations having the location of the GPS receiver 104 (x, y, z, and time variables) can be solved simultaneously. Thus, x 214, y 216, z 218, and time values for the GPS receiver 104 are identified from the four pseudorange equations and the four pseudorange values.

It is possible that an erroneous measurements may occur or a sudden change in location of the GPS receiver 104 may corrupt the calculations of the values of x, y, z, and time associated with GPS receiver 104. So, a check is made by calculating the pseudo range from the derived values x, y, z and time, and should result in the expected range to each of the GPS satellites 102, 304, 308, and 312.

By avoiding the need to collect a sub-frame to establish local GPS time reduces the position update time by up to 6 seconds and allows updates to occur in a fraction of a second. Faster acquisition time results in faster position determination and in mobile communication systems means quicker location identification and reduced response time.

Figure 5:
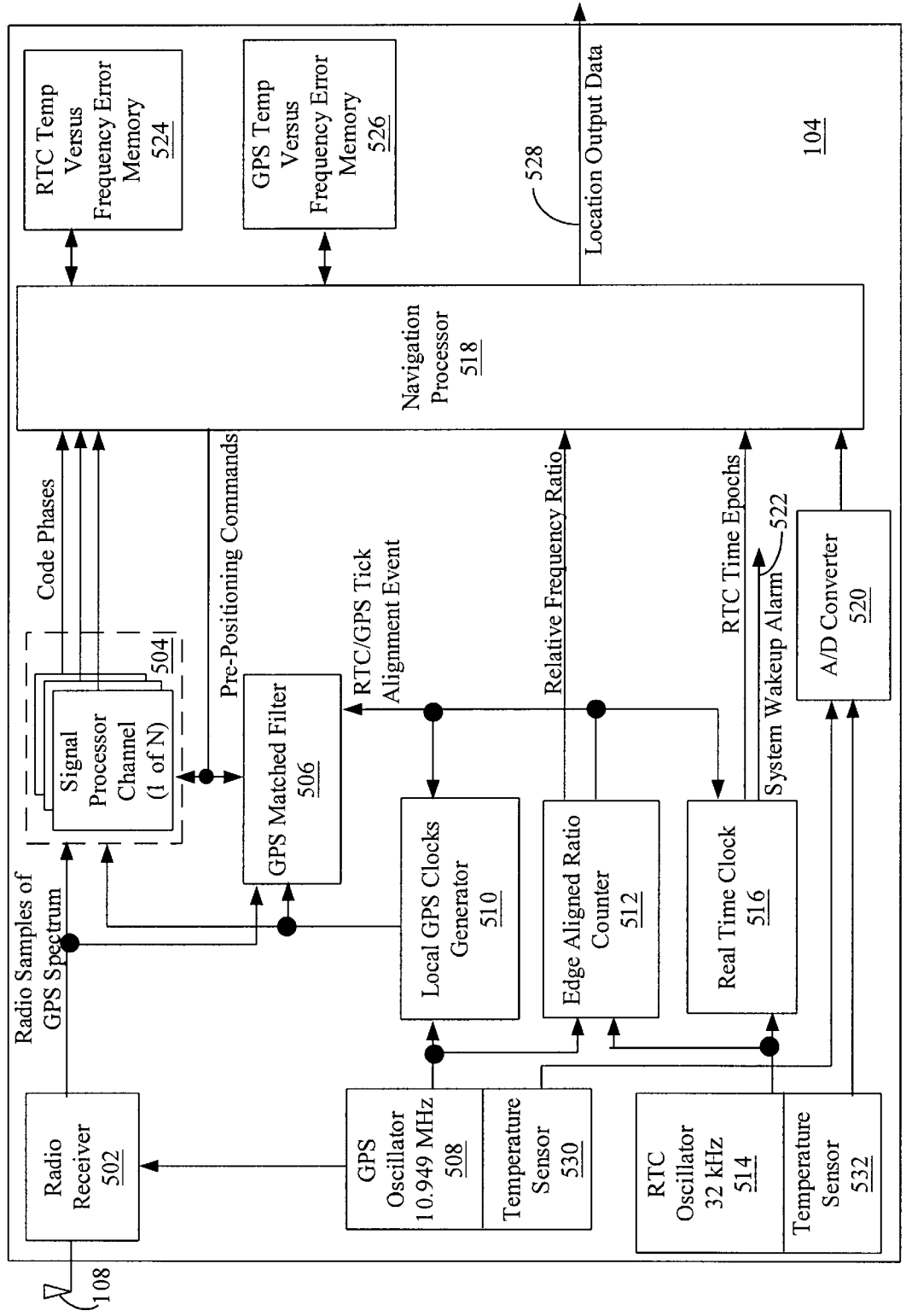
FIG. 5 is a block diagram of the GPS receiver of FIG. 1.

In FIG. 5, a block diagram of the GPS receiver 104, FIG. 1 is shown. The GPS receiver 104 has a radio receiver 502 connected to an antenna 108 for receiving samples of the GPS spread spectrum signal from multiple satellites. A signal processor 504 having a plurality of channels (1–N, with N being 12 in the current embodiment) receives the Radio Samples of GPS Spectrum from the radio receiver 502 along with the GPS matched filter 506. The GPS radio receiver 502 also receives a timing signal from a GPS oscillator 508. The GPS oscillator 508 also supplies timing to the local GPS clock generator 510 and the edge aligned ratio counter 512. A real time clock (RTC) 32 kHz oscillator 514 supplies a timing signal to the real time clock 516 and the edge aligned ratio counter 512. The signal processor 504 identifies code phases associated with the different GPS satellites and sends the code phases to a navigation processor.

The navigation processor 518 is connected by a second connection to the signal processor 504 and GPS matched filter 506. The navigation processor is connected to the output of the edge aligned ratio counter 512, the output of an analog-to-digital (A/D) converter 520 and the output of the real time clock 516. The real time clock 516 also has another output that is a system wakeup alarm signal 522. Further, the navigation processor communicates with real time clock (RTC) temperature versus frequency error memory 524 and GPS Clock temperature versus frequency error memory 526. In alternate embodiments, the two memories 524 and 526 may be segments within a single common memory device. The results of processing the received GPS signal are location output data 528. The edge aligned ratio counter is connected to the local GPS clocks generator 510 and the real time clock 516. The GPS oscillator 508 and the RTC oscillator 514 have an associated temperature sensor 530 and 532 respectively, that are connected to the A/D converter 520.

The radio receiver 502 accepts the GPS signal 210 from an antenna 108 and selects the GPS L1 band (1575.42 MHz) for processing. The radio receiver 502 provides In-Phase (I) and Quadrature-Phase (Q) output signals. Time sampling of the quantized signals from the radio receiver 502 occurs in the GPS matched filter. The quantized signals from the radio receiver 502 are also received at the signal processor 504. Each signal processor (SP) channel is able to search for and then track one received GPS signal (one satellite). If N is equal to 12 SP channels, then twelve satellites may be tracked simultaneously. In order to search for and acquire a satellite signal for tracking, a SP channel receives sequences of pre-positioning commands from the navigation processor 518 (along with the GPS matched filter 506). The pre-positioning commands set the specific the specific GPS PN code in the signal processor 504 associated with a signal processor channel and the GPS matched filter 506. The pre-positioning commands also contain a value of Doppler to correct for, a value or GPS oscillator error to correct for and the code phase to dwell on for a specified period of time. If the pre-positioning commands are such that the PN code, code phase and frequency correction matches that of one of the satellite GPS signals present in the received GPS signal, the energy accumulated by integrating the cross-correlation of the local replica waveform and the received satellite GPS signal over the dwell time will exceed a threshold. In that event, the processor will provide a sequence of commands to keep the received satellite GPS signal in track by appropriately adjusting the code phase and frequency error values to account for motion of the satellites, receiver system and other effects such as drift in the GPS oscillator due to temperature. In the case where the integrated energy over the dwell time does not exceed a threshold, additional commands are issued to search for the signal at other code phase and frequency error values. Once a GPS satellite signal is being tracked, the code phase of the signal is continuously available to the processor. Since the code phase is defined as the amount of PN code generator delay of the PN code from a local timing epoch, and the code period is 1 ms (1023 chips in length), the code phase value specifies the propagation delay from the GPS satellite modulo 1 ms. Since the average propagation delay from a satellite in the GPS system is 70 ms, the remaining range ambiguity is left to be resolved as described below.

The GPS matched filter 506 is an alternate means of estimating the current code phase, Doppler and oscillator frequency error for one or more GPS satellite signals. The SP channels, as described above, receive a continuous stream of radio samples and process these samples by cross-correlating them with a local reference sample stream for a command set of PN code, code phase and frequency offset values. Each new hypothesis of these values is processed in sequence. In contrast, the matched filter 506 acquires and stores a fixed sequence of received GPS signal samples and then tests these samples by cross-correlating them with a commanded range of PN codes, code phases and frequency offsets. Whereas the SP channels can only process the GSP signal samples in real-time, the GPS matched filter 506 can process them faster than real-time. A speed-up advantage of using a GPS matched filter can typically be hundreds of times the speed of real-time processing of signal processor 504 having 12 SP channels.

The GPS oscillator is a 10.949 MHz oscillator. A more precise value is $137*F_0/128$, where $F_0$ is F Naught, a fundamental parameter of the GPS system. The L1 frequency of the GPS signal is $154*F_0$. The chip rate of the GPS C/A codes is $F_0/10$ with the value of $F_0$ is 10.23 MHz. The GPS oscillator 508 supplies its oscillator signal (10.949 MHz) to the radio receiver 502 that enables the radio receiver 502 to operate the I and Q-quantizers. The GPS oscillator 508 also supplies the oscillator signal to the edge aligned ratio counter 512. Similarly, the RTC oscillator 514 uses a frequency of 32.768 KHz and is used to generate the timing for the real time clock 516 and by the edge aligned ratio counter 516.

The local GPS clock generator 510 receives the 10.949 MHz signal from the GPS Oscillator 508 and derives a number of clocks from it that are used by the signal processor 504 and GPS matched filter 506. The derived clocks are the local GPS time-base and have some error relative to the GPS system clock, which is a network of atomic-standard-based system clocks on board the satellites and in the ground control segment of the GPS system. One of the local timing epochs is called the T20 clock. The name derives from the fact that it is 20 ms between clock ticks. All of the code phases measured in the GPS SP channels and GPS matched Filter 506 are referred to the T20 clock.

Both the GPS oscillator 508 and the RTC oscillator 514 have associated temperature sensors 530 and 532 respectively. The temperature of an oscillator (crystal) is affected by temperature, thus for timing accuracy an adjustment for temperature is made. A band-gap reference circuit is typically used to produce a voltage that is proportional to absolute temperature in Kelvins. The voltage varies a few millivolts per Kelvin or, equivalently, per degree Celsius. For measuring oscillator temperature, one generally wants to measure the temperature of the oscillator's crystal, since this is where the primary temperature effect occurs. The ideal sensor would be mounted on or inside the crystal package for optimum thermal tracking. For cost reasons, it is often preferred to create the temperature sensor with another semiconductor device.

An A/D converter 250 receives the voltages from the each of the temperature sensors 530 and 532 respectively. The A/D converter converts the received voltages into digital signals for use by the navigation processor 518. The A/D converter 250 can function a relatively low rate of speed and may produce 2000 12-bit conversions per second. The 2000 conversions may be multiplexed among several signals, such as the two temperature inputs shown in FIG. 4. For temperature sensor inputs, an A/D converter 250 processing approximately 50 samples per second is typically sufficient. When determining the temperature versus frequency error data, the desire is to have the temperature values monotonic and that the temperature values be consistent from one operating session to the next. The absolute value of the temperature is not as important as the consistency of the generated temperature voltages. The A/D converter 520 may be implemented with other sampling rates and conversion rates than described as long as there is consistency of generated temperature temperatures is consistent from one operating session to the next.

The real time clock 516 is a time-keeping circuit that is active when the GPS receiver 104 is powered off. It is preferred to be an ultra-low-power circuit as to not excessively drain the battery while the GPS receiver 104 is powered off. The real time clock 516 keeps GPS time, rather than universal time (UTC or Greenwich Mean Time). Thus, the real time clock 516 does not keep track of seconds, hours, days, months, and years. Rather, the real time clock 516 keeps track of GPS time, with a resolution of one 32768 Hz tick, approximately $30\approx$-seconds. In other embodiments other types of time systems may be used, such as UTC time. The real time clock 516 receives the RTC oscillator signal from the RTC oscillator 514 in order to generate a RTC time epochs. The RTC epochs are sent to the navigation processor 518.

The real time clock 516 also generates a system wakeup alarm 522. The real time clock 516 has a register that is loaded with a wake up time. When the real time clock 516 reaches this time, a wakeup signal 522 is generated. The wakeup signal may be used to further implement power saving operations that periodically power up GPS receiver 104 for the purpose of updating current time and/or position.

The edge aligned ratio counter 512 measures the frequency of one clock relative to another clock. It also has the capability to transfer the clock phase of one clock to another. In its simplest form, the edge aligned ratio counter 512 simply counts the number of cycles of the measured clock that occur during a fixed number of cycles of a reference clock. For example, if 50 cycles are measured of the measured clock during 100 cycles of the reference clock, the measured clock is running at one half the rate of the reference clock. If the clocks are not synchronously related, there is an error in the measurement of one cycle of the faster clock. The fractional accuracy of the measurement improves as the length of the measurement is increased. In order to improve the relative accuracy more efficiently than the linear improvement with measurement time, the edge aligned ration counter 512 is used. In essence, if one has an estimation of the relative frequencies involved, then the measuring of the two clocks can start and stop when the edges of the two clocks are very nearly in alignment. Therefore, by arranging for integer count of both clocks to occur reduces the measurement error. By using the T20 and RTC clocks in the EARC, the RTC value at a T20 epoch can be determined with high accuracy, even though the clocks run at frequencies that differ by 3 orders of magnitude.

The navigation processor 518 receives the code phases from the signal processor 504 which are measured relative to the T20 epochs. It also receives the data from the EARC that specifies the time offset between T20 epochs and RTC times. By transferring GPS time from the RTC to the T20 epochs, the fast acquisition method avoiding sub-frame collection can be avoided when the RTC has maintained GPS time to better than 0.5 ms accuracy. By processing the received code phases from at least four satellites the navigation processor 518 can solve four satellite location equations simultaneously resulting in the location of the GPS receiver 104 and the error in the received GPS time as described in FIG. 4.

The calculation of the GPS receiver location and error in the receiver GPS time is partially dependent on the RTC time epochs from the real time clock 516 and the relative frequency ratio from the edge aligned ratio counter 512. Since the oscillators 508 and 514 supply the timing signal for the clocks, any fluctuation in the timing signal due to temperature affects the calculations performed by the navigation processor 518. The navigation processor 518 adjusts for temperature fluctuations by using adjustment values stored in the RTC temp versus frequency error memory 524 and GPS Clock temp versus frequency error memory 526. The memories 524 and 526 are tables of temperature adjustments to be used by the navigation processor 518 while calculating the GPS receiver location and error in the received GPS time. The navigation processor 518 receives the digital temperature data from the temperature sensors 530 and 532 via the A/D converter 520. The navigation processor 518 outputs the GPS receiver location and time as location output data 528. Because the GPS code phase data is measured with respect to the GPS clocks via the T20 epochs, the solution of the GPS navigation equations provide a calibration of the GPS clock rate and phase (frequency and time) relative to the highly accurate GPS system. Using the EARC, the RTC can then be calibrated by transferring the rate and phase error from the GPS clocks to the RTC. By taking the temperature of the GPS oscillator and the RTC oscillator at the time the calibration is made, the correction factors for GPS clock rate and RTC rate can be stored in memory for later use. This later use is to maintain RTC accuracy to 0.5 ms in the absence of GPS navigation updates and to calibrate the GPS clock so that the radio signals can be more rapidly acquired the next time GPS navigation updating is desired.

Figure 6:
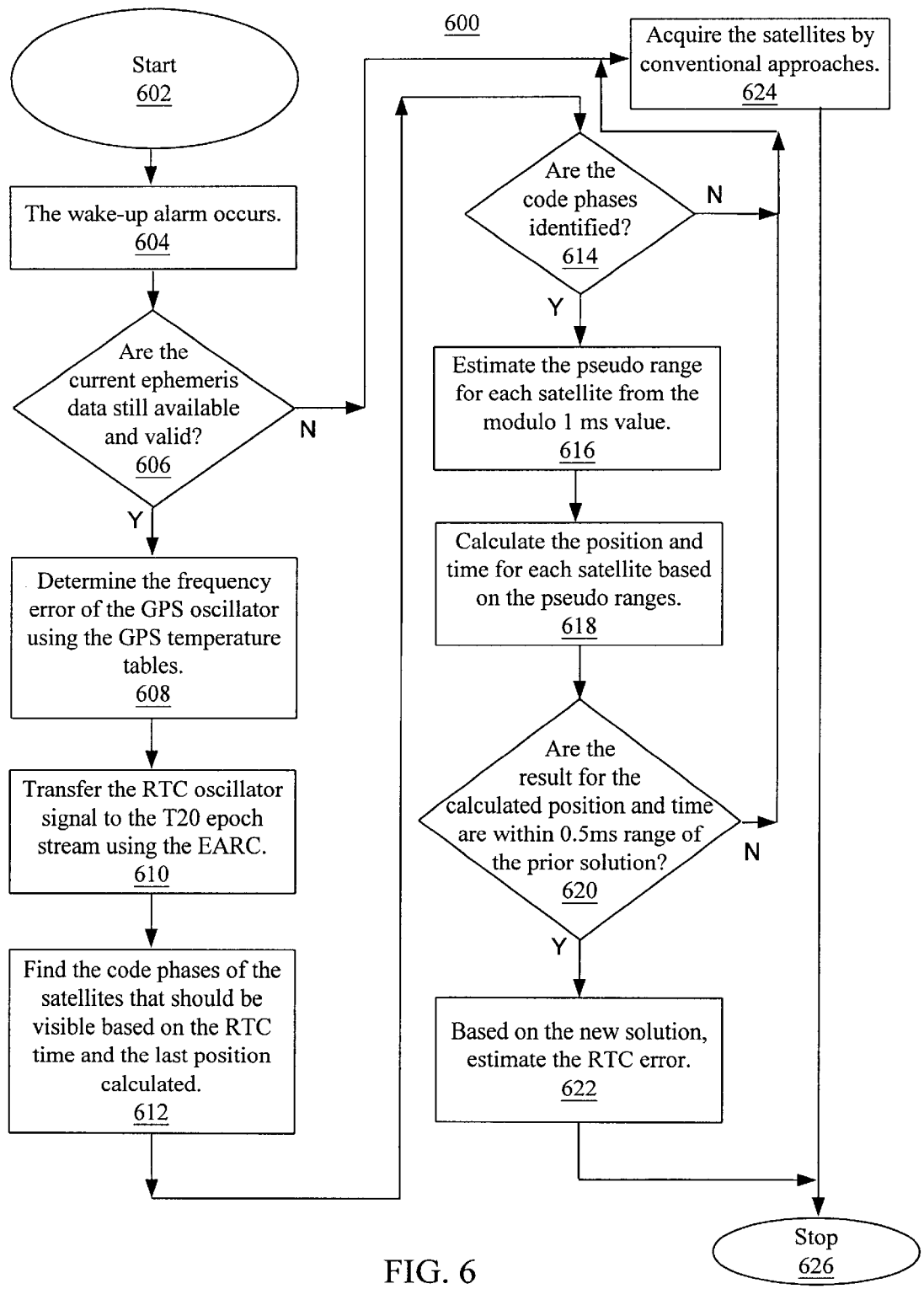
FIG. 6 is a flow chart illustrating the method steps for determining the location of the GPS receiver shown in FIG. 5.

Turning to FIG. 6, a flow chart 600 illustrating the method steps for determining the location of the GPS receiver shown in FIG. 5. The GPS receiver 104 starts (602) by the unit receiving power. The process may also start if the wake-up alarm has been previously set and has expired (604) within the real time clock 516. The navigational processor 518 determines if ephemeris data is still available and valid (606). The data may be stored in cache within the navigation processor or in external memory. The ephemeris data may become invalid if the GPS receiver has not updated it recently. Ephemeris data typically expires in three to four hours after it is collected from a satellite. In addition, the satellites in view change frequently, with satellites rising and setting at a typical rate of a few per hour. Ephemeris of newly risen satellites must be collect from the satellite of obtained from another source. If the ephemeris data is not available to the navigation processor 518 (606), the GPS satellites are acquired by conventional approaches involving ephemeris data collection (624) and processing completes (626).

If the ephemeris data is available, then the frequency error of the GPS oscillator 508 using the GPS temperature tables stored in the GPS temp versus frequency error memory 526 is determined (608) by the navigation processor 518. The navigation processor 518 via the A/D converter 520 receives the temperature of the GPS oscillator 508. The RTC oscillator signal from the RTC oscillator 514 is received at the edge aligned ration counter 512, which generates a RTC/GPS tick alignment event used to transfer the RTC time to the T20 epoch (610). The signal processor 504 then identifies the code phases of the received GPS signal (612) relative to the T20 epochs.

If the code phases are identified (614) for at least four GPS satellites, then an estimate for the pseudo range for each satellite from the modulo 1 ms value is determined (616) resulting in four equations with four unknown values (x, y, z, and time). In another embodiment, the code phases from only three GPS satellites may be identified and pseudo ranges determined, but the altitude in GPS position must be know to reasonable accuracy beforehand. If the code phases are not identifiable, then the satellites are acquired by conventional approaches (624) and processing is complete (626).

Using the calculated pseudo ranges (618) for the four satellites, the position (x, y, z, and time) is calculated by solving the four equations simultaneously (618). A check is then made of the calculated receiver position and time to determine if the results are within 0.5 ms total equivalent error range of the prior solutions (620). If the calculated position and time error is within 0.5 ms range of the prior solution (620), then the real time clock error for the current temperature is estimated and stored based on the new position and time solutions (622) and processing is complete (626). If the result for the calculated position and time of the satellites is greater than the 0.5 ms range (620), then the satellites are acquired by conventional approaches (624) and processing is complete (626).

It is appreciated by those skilled in the art that the process shown in FIG. 6 may selectively be implemented in hardware, software, or a combination of hardware and software. An embodiment of the process steps employs at least one machine-readable signal bearing medium. Examples of machine-readable signal bearing mediums include computer-readable mediums such as a magnetic storage medium (i.e. floppy disks, or optical storage such as compact disk (CD) or digital video disk (DVD)), a biological storage medium, or an atomic storage medium, a discrete logic circuit(s) having logic gates for implementing logic functions upon data signals, an application specific integrated circuit having appropriate logic gates, a programmable gate array(s) (PGA), a field programmable gate array (FPGA), a random access memory device (RAM), read only memory device (ROM), electronic programmable random access memory (EPROM), or equivalent. Note that the computer-readable medium could even be paper or another suitable medium, upon which the computer instruction is printed, as the program can be electronically captured, via for instance optical scanning of the paper or other medium, then compiled, interpreted or otherwise processed in a suitable manner if necessary, and then stored in a computer memory.

Additionally, machine-readable signal bearing medium includes computer-readable signal bearing mediums. Computer-readable signal bearing mediums have a modulated carrier signal transmitted over one or more wire based, wireless or fiber optic networks or within a system. For example, one or more wire based, wireless or fiber optic network, such as the telephone network, a local area network, the Internet, or a wireless network having a component of a computer-readable signal residing or passing through the network. The computer readable signal is a representation of one or more machine instructions written in or implemented with any number of programming languages.

Furthermore, the multiple process steps implemented with a programming language, which comprises an ordered listing of executable instructions for implementing logical functions, can be embodied in any machine-readable signal bearing medium for use by or in connection with an instruction execution system, apparatus, or device, such as a computer-based system, controller-containing system having a processor, microprocessor, digital signal processor, discrete logic circuit functioning as a controller, or other system that can fetch the instructions from the instruction execution system, apparatus, or device and execute the instructions.

While various embodiments of the invention have been described, it will be apparent to those of ordinary skill in the art that many more embodiments and implementations are possible that are within the scope of this invention.

What is claimed is:

1. An apparatus, comprising:
   a receiver in receipt of a signal having a plurality of pseudo noise codes which each of the pseudo noise codes of the plurality of pseudo noise codes originates from a GPS transmitter;
   a local clock with an error of less than 0.5 ms relative to a GPS time; and
   a decoder connected to the receiver and the local clock which is synchronized to the signal, identifies at least four pseudo range equations for at least four GPS transmitters from the plurality of GPS transmitters, and determines a location of the receiver by simultaneously solving the four pseudo range equations where the at least four pseudo range equations have terms associated with propagation delay of chips and when the at least four pseudo range equations are solved for position and time, and the at least four pseudo range equations are within 0.5 ms of a prior solution.

2. The apparatus of claim 1, wherein a plurality of chips make up each pseudo noise code in the plurality of pseudo noise code and the plurality of chips is offset between 511 chips before a pseudo noise code boundary and 512 chips after the pseudo noise code boundary.

3. The apparatus of claim 2, wherein each of the pseudo range (PR) equations when the pseudo noise code boundary is less than 512 chips and an estimated range is R, a chip from the plurality of chips transmitted at T time $C_k$ is received at the receiver as a chip $C_j$ that is offset from an expected chip $\hat{C}_j$, and $L_{chip}$ is a distance that the signal propagates in one chip time (c/1.023e6=293.0522561 m), is;

$$PR=R-(C_j-\hat{C}_j)L_{chip}.$$

4. The apparatus of claim 2, wherein each of the pseudo range (PR) equations when the pseudo noise code boundary is greater than 511 chips and has an estimated range R, a chip from the plurality of chips transmit at T time $C_k$, received at the receiver as a chip $C_j$ that is offset from an expected chip $\hat{C}_j$, and $L_{chip}$ being a distance that the signal propagates in one chip time (c/1.023e6=293.0522561 m), is;

$$PR=R+\lfloor 1023-(C_j-\hat{C}_j)\rfloor L_{chip}.$$

5. The apparatus of claim 1, wherein a time error in the local clock is identified and corrected upon the determination of the location of the receiver is correct.

6. The apparatus of claim 1, further comprising:
   a temperature sensor attached to a crystal in the local clock to take heat measurements of the crystal and reports heat measurements to the decoder to enable the decoder to adjust the local clock readings in response to heat measurements.

7. The Apparatus of claim 1, where the decoder further comprises:
   a received PN chip compared to an expected PN for each of the at least four GPS transmitters and each of the four pseudo range equations using a respective difference between the received PN chip and the expected PN chip.

8. The apparatus of claim 1, wherein the local clock is a free running clock.

9. A method, comprising:
   receiving at a receiver a signal generated at a plurality of GPS transmitters;
   synchronizing the receiver to the signal;
   identifying at least four pseudo noise codes in the signal at the receiver;
   calculating time with a local clock having an error of less than 0.5 ms relative to a GPS time;
   deriving at least four pseudo range equations from each of the at least four pseudo noise codes where the at least four pseudo range equations have terms associated with propagation delay of chips; and
   locating the receiver by solving the at least four pseudo range equations simultaneously when the at least four pseudo range equations are solved, the at least four pseudo range equations are within 0.5 ms of a prior solution.

10. The method of claim 9, further comprises:
    solving each of the at least four pseudo range equations when the pseudo noise code boundary is less than 512 chips and an estimated range is R, a chip from the plurality of chips transmitted at T time $C_k$ is received at the receiver as a chip $C_j$ that is offset from an expected chip $\hat{C}_j$, and $L_{chip}$ is a distance that the signal propagates in one chip time (c/1.023e6=293.0522561 m), is;

$$PR=R-(C_j-\hat{C}_j)L_{chip}.$$

11. The method of claim 9, further comprising:
    solving each of the pseudo range (PR) equations when the pseudo noise code boundary is greater than 511 chips and has an estimated range R, a chip from the plurality of chips transmit at T time $C_k$, received at the receiver as a chip $C_j$ that is offset from an expected chip $\hat{C}_j$, and $L_{chip}$ being a distance that the signal propagates in one chip time (c/1.023e6=293.0522561 m), is;

$$PR=R+\lfloor 1023-(C_j-\hat{C}_j)\rfloor L_{chip}.$$

12. An apparatus, comprising:
    means for receiving at a receiver a signal generated at a plurality of GPS transmitters;

means for identifying at least four pseudo noise codes in the signal upon synchronization of the signal at the receiver;

means for calculating time with a local clock having an error of less than 0.5 ms relative to a GPS time;

means for deriving at least four pseudo range equations from each of the at least four pseudo noise codes; and means for locating the receiver by solving the at least four pseudo range equations simultaneously where the at least four pseudo range equations have terms associated with propagation delay of chips and when the at least four pseudo range equations are solved for position and time, and the at least four pseudo range equations are within 0.5 ms of a prior solution.

13. The apparatus of claim 12, further comprises:

means for solving each of the at least four pseudo range equations when the pseudo noise code boundary is less than 512 chips and an estimated range is R, a chip from the plurality of chips transmitted at T time $C_k$ is received at the receiver as a chip $C_j$ that is offset from an expected chip $\hat{C}_j$, and $L_{chip}$ is a distance that the signal propagates in one chip time (c/1.023e6= 293.0522561 m), is;

$$PR=R-(C_j-\hat{C}_j)L_{chip}.$$

14. The apparatus of claim 12, further comprising:

means for solving each of the pseudo range (PR) equations when the pseudo noise code boundary is greater than 511 chips and has an estimated range R, a chip from the plurality of chips transmit at T time $C_k$, received at the receiver as a chip $C_j$ that is offset from an expected chip $\hat{C}_j$, and $L_{chip}$ being a distance that the signal propagates in one chip time (c/1.023e6= 293.0522561 m), is;

$$PR=R+\lfloor 1023-(C_j-\hat{C}_j)\rfloor L_{chip}.$$

15. A machine-readable signal bearing medium containing instructions that cause a controller to perform a method for fast satellite acquisition, the method comprising:

receiving at a receiver a signal generated at a plurality of GPS transmitters;

identifying at least four pseudo noise codes in the signal at the receiver;

calculating time with a local clock having an error of less than 0.5 ms relative to a GPS time;

deriving at least four pseudo range equations from each of the at least four pseudo noise codes; and locating the receiver by solving the at least four pseudo range equations simultaneously where the at least four pseudo range equations have terms associated with propagation delay of chips and when the at least four pseudo range equations are solved for position and time, and the at least four pseudo range equations are within 0.5 ms of a prior solution.

16. The method of claim 15, further comprises:

solving each of the at least four pseudo range equations when the pseudo noise code boundary is less than 512 chips and an estimated range is R, a chip from the plurality of chips transmitted at T time $C_k$ is received at the receiver as a chip $C_j$ that is offset from an expected chip $\hat{C}_j$, and $L_{chip}$ is a distance that the signal propagates in one chip time (c/1.023e6=293.0522561 m), is;

$$PR=R-(C_j-\hat{C}_j)L_{chip}.$$

17. The method of claim 15, further comprising:

solving each of the pseudo range (PR) equations when the pseudo noise code boundary is greater than 511 chips and has an estimated range R, a chip from the plurality of chips transmit at T time $C_k$, received at the receiver as a chip $C_j$ that is offset from an expected chip $\hat{C}_j$, and $L_{chip}$ being a distance that the signal propagates in one chip time (c/1.023e6=293.0522561 m), is;

$$PR=R+\lfloor 1023-(C_j-\hat{C}_j)\rfloor L_{chip}.$$

* * * * *